(12) United States Patent
Ye

(10) Patent No.: US 11,886,675 B2
(45) Date of Patent: Jan. 30, 2024

(54) TOUCH ASSEMBLY AND TOUCH DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Jian Ye, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 529 days.

(21) Appl. No.: 17/050,361

(22) PCT Filed: Aug. 7, 2020

(86) PCT No.: PCT/CN2020/107810
§ 371 (c)(1),
(2) Date: Oct. 23, 2020

(87) PCT Pub. No.: WO2021/248668
PCT Pub. Date: Dec. 16, 2021

(65) Prior Publication Data
US 2023/0119216 A1    Apr. 20, 2023

(30) Foreign Application Priority Data

Jun. 12, 2020 (CN) .......................... 202010537456.7

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

2011/0141038 A1   6/2011   Kuo et al.
2018/0059843 A1*  3/2018   Kim ...................... G06F 3/0412

FOREIGN PATENT DOCUMENTS

| CN | 102654806 A | 9/2012 |
| CN | 103186306 A | 7/2013 |
| CN | 104199586 A | 12/2014 |

(Continued)

*Primary Examiner* — Nicholas J Lee
(74) *Attorney, Agent, or Firm* — PV IP PC; Wei Te Chung; Zhigang Ma

(57) ABSTRACT

A touch assembly and a touch display device are provided. The touch assembly includes a touch layer, the touch layer includes a plurality of touch units, and each of the touch units includes a first electrode disposed along a first direction and a second electrode disposed along a second direction. The first electrode is electrically insulated from the second electrode; wherein near an intersection of the first electrode and the second electrode, the first electrode includes at least one recessed portion, and the second electrode includes at least one protrusion mating with the at least one recessed portion.

18 Claims, 6 Drawing Sheets

(56) References Cited

FOREIGN PATENT DOCUMENTS

| | | | |
|---|---|---|---|
| CN | 105320372 | A | 2/2016 |
| CN | 105404408 | A | 3/2016 |
| CN | 108628483 | A | 10/2018 |
| CN | 109213383 | A | 1/2019 |
| CN | 109917969 | A | 6/2019 |
| CN | 110928436 | A | 3/2020 |
| CN | 111045543 | A | 4/2020 |
| CN | 111176484 | A | 5/2020 |
| JP | 2013069261 | A | 4/2013 |

\* cited by examiner

TOUCH ASSEMBLY AND TOUCH DISPLAY DEVICE

RELATED APPLICATIONS

This application is a Notional Phase of PCT Patent Application No. PCT/CN2020/107810 having international filing date of Aug. 7, 2020, which claims the benefit of priority of Chinese Patent Application No. 202010537456.7 filed on Jun. 12, 2020. The contents of the above applications are all incorporated by reference as if fully set forth herein in their entirety.

FIELD OF INVENTION

The present application relates to the field of touch technologies, and in particular to touch assemblies and touch display devices.

BACKGROUND OF INVENTION

Capacitive touch screens are widely used in various electronic interactive scene devices because of their high durability, long service life, and support for multi-touch functions. The capacitive touch screens detect a specific position touched by a finger by detecting a change of capacitance at a touch position of the finger.

As shown in FIG. 1, it is a schematic diagram of a touch electrode of a traditional flexible active matrix organic light-emitting diode (AMOLED) touch external (oncell) display screen, and the touch electrode is made of a hollow metal grid (metal mesh). The touch electrode includes a driving electrode Tx and a sensing electrode Rx, the driving electrode Tx and the sensing electrode Rx are arranged in a same layer and are insulated from each other, the driving electrode Tx and the sensing electrode Rx are both diamond-shaped electrodes, two adjacent sensing electrodes Rx are continuously set, and two adjacent driving electrodes Tx are connected to each other through a bridge line B. Since the driving electrode Tx and the sensing electrode Rx are diamond-shaped, an impedance load of the driving electrode Tx and the sensing electrode Rx is larger, which results in an increase in a scanning time of a touch, leading to a decrease in a reporting rate of the touch, and is not conducive to satisfying a requirement of increasing the reporting rate of the touch.

Therefore, it is necessary to propose a technical solution to solve the problem of a decrease in the touch reporting rate due to a large impedance load when the driving electrode and the sensing electrode are diamond-shaped.

SUMMARY OF INVENTION

Technical Problem

The purpose of the present application is to provide a touch assembly and a touch display device to reduce an impedance of one of a first electrode and a second electrode near an intersection while reducing an impedance of the other one near the intersection.

Technical Solution

To achieve the above object, the present application provides a touch assembly, the touch assembly including a touch layer, wherein the touch layer includes a plurality of touch units, and each of the touch units includes:

a first electrode disposed along a first direction; and,
a second electrode disposed along a second direction, wherein the first electrode is electrically insulated from the second electrode;
wherein near an intersection of the first electrode and the second electrode, the first electrode includes at least one recessed portion, and the second electrode includes at least one protrusion mating with the at least one recessed portion.

In the above-mentioned touch assembly, the first electrode includes a first rectangular trunk extending in the first direction, the at least one recessed portion is disposed along an edge of the first rectangular trunk parallel to the first direction; and wherein the second electrode includes a second rectangular trunk extending in the second direction, the second rectangular trunk includes a widening portion arranged near the intersection of the first electrode and the second electrode, and the widening portion includes the at least one protrusion.

In the above-mentioned touch assembly, each of the first electrode includes a plurality of the recessed portions, and the recessed portions are symmetrically disposed on opposite sides of the first rectangular trunk.

In the above-mentioned touch assembly, the first electrode includes a plurality of first hollow portions, the first hollow portions are symmetrically disposed on opposite sides of the first rectangular trunk, and the first hollow portions are disposed along the edge of the first rectangular trunk parallel to the first direction; and/or wherein the second electrode includes a plurality of second hollow portions, the second hollow portions are symmetrically disposed on opposite sides of the second rectangular trunk, and the second hollow portions are disposed along an edge of the second rectangular trunk parallel to the second direction.

In the above-mentioned touch assembly, an included angle between the first hollow portions and the first rectangular trunk is greater than 0 degree and less than 90 degrees, and the first hollow portions extend in a direction away from the second rectangular trunk adjacent to the first hollow portions; and wherein an included angle between the second hollow portions and the second rectangular trunk is greater than 0 degree and less than 90 degrees, and the second hollow portions extend in a direction away from the first rectangular trunk adjacent to the second hollow portion.

In the above-mentioned touch assembly, the included angle between the first hollow portions and the first rectangular trunk is equal to 45 degrees, and the included angle between the second hollow portions and the second rectangular trunk is equal to 45 degrees.

In the above-mentioned touch assembly, the touch layer further includes a plurality of floating electrodes, the plurality of floating electrodes are electrically insulated from the first electrode and the second electrode, and the plurality of the floating electrodes are respectively disposed in the first hollow portions and the second hollow portions.

In the above-mentioned touch assembly, a shape of each of the first hollow portions is trapezoid, and a shape of each of the second hollow portions is trapezoid.

In the above-mentioned touch assembly, the first hollow portions are formed by enclosing a first bottom edge, a first top edge, a first hypotenuse, and a second hypotenuse, the first bottom edge is opposite to and parallel to the first top edge, the first hypotenuse is opposite to the second hypotenuse, the first hypotenuse is connected between the first bottom edge and the first top edge, the second hypotenuse is connected between the first bottom edge and the first top edge, and the first hypotenuse coincides with an edge portion of the first rectangular trunk parallel to the first direction; and wherein the second hollow portions are formed by enclosing a second bottom edge, a second top edge, a third hypotenuse, and a fourth hypotenuse, the second bottom edge is opposite and parallel to the second top edge, the third hypotenuse is opposite to the fourth hypotenuse, the third hypotenuse is connected between the second bottom edge and the second top edge, the fourth hypotenuse is connected between the second bottom edge and the second top edge, and the third hypotenuse coincides with an edge portion of the second rectangular trunk parallel to the second direction.

In the above-mentioned touch assembly, at the intersection of the first electrode and the second electrode, the first electrode further includes a first narrowing portion connected to the first rectangular trunk, a width of the first narrowing portion decreases from close the first rectangular trunk to away from the first rectangular trunk;

the second electrode further includes a second narrowing portion connected to the second rectangular trunk, and a width of the second narrowing portion decreases from close the second rectangular trunk to away from the second rectangular trunk.

In the above-mentioned touch assembly, the first electrode is continuously formed, the second electrode is connected by a bridge line, and the bridge line and the first electrode are positioned at different layers.

In the above-mentioned touch assembly, number of the first electrode arranged in a row along the first direction is greater than number of the second electrode arranged in a row along the second direction, a parasitic capacitance of each of the first electrode is less than a parasitic capacitance of each of the second electrode.

In the above-mentioned touch assembly, the parasitic capacitance of each of the first electrode is less than or equal to 8 picofarads and greater than 0 picofarad, and the parasitic capacitance of each of the second electrode is less than or equal to 10 picofarads and greater than 0 picofarad.

In the above-mentioned touch assembly, an effective area of each of the first electrode is less than an effective area of each of the second electrode, and the effective area is an area of a conductive portion.

In the above-mentioned touch assembly, each of the first electrode includes two first isosceles right-angled triangular electrodes electrically connected, each of the first isosceles right-angled triangular electrodes includes two first right-angle sides, and at least one of the first right-angle sides of each first isosceles right-angled triangular electrode is provided with the at least one recessed portion; and wherein each of the second electrode includes two second isosceles right-angled triangular electrodes electrically connected, each of the second isosceles right-angled triangular electrodes includes two second right-angle sides, and at least one of the second right-angle sides of each of the second isosceles right-angled triangular electrodes is provided with the at least one protrusion.

In the above-mentioned touch assembly, cross-sectional shapes of the at least one recessed portion and the at least one protrusion are right-angled triangles.

A touch display device, the touch display device includes the above-mentioned touch assembly and a display panel.

In the above-mentioned touch display device, wherein the first electrode includes the first rectangular trunk extending in the first direction, and the at least one recessed portion is disposed along the edge of the first rectangular trunk parallel to the first direction; and wherein the second electrode includes the second rectangular trunk extending in the second direction, the second rectangular trunk includes the widening portion arranged near the intersection of the first electrode and the second electrode, and the widening portion includes the at least one protrusion.

In the above-mentioned touch display device, wherein the display panel includes a plurality of sub-pixels, the touch assembly is positioned on a light-outputting surface of the display panel, wherein the first rectangular trunk surrounds at least five of the sub-pixels along a width direction of the first rectangular trunk;

wherein the second rectangular trunk surrounds at least five of the sub-pixels along a width direction of the second rectangular trunk, and a difference between number of the sub-pixels surrounded by the widening portion in the width direction of the second rectangular trunk and number of the sub-pixels surrounded by the second rectangular trunk in the width direction of the second rectangular trunk is greater than or equal to five and less than or equal to fifteen; and wherein the first electrode and the second electrode are both composed of a metal grid.

In the above-mentioned touch display device, at the intersection of the first electrode and the second electrode, the first electrode surrounds at least two of the sub-pixels along the width direction of the first rectangular trunk, and the second electrode surrounds at least two of the sub-pixels along the width direction of the second rectangular trunk.

Beneficial Effect

In the present application, by providing a recessed portion on the first electrode and a protrusion on the second electrode to ensure that the impedance of the first electrode near the intersection of the first electrode and the second electrode does not increase, while reducing the impedance of the second electrode near the intersection of the first electrode, the second electrode reduces a resistance-capacitance load of the second electrode and reduces the time required for scanning of the touch display device, thereby increasing the reporting rate. In addition, the protrusion cooperates with the recessed portion to increase a mutual capacitance between the first electrode and the second electrode, which is beneficial to improving the sensitivity of touch control.

The drawings are marked as follows: 100 touch display device; 10 substrate; 20 thin film transistor array layer; 30 organic light-emitting diode array layer; 40 encapsulation layer; touch layer; 501 touch unit; 5011 first electrode; 50111 first rectangular trunk; 50112 first narrowing portion; 5011a recessed portion; 5011b first right-angle side; 5011c first hollow portion; 5012 second electrode; 50121 second rectangular trunk; 50122 second narrowing portion; 50121a widening portion; 5012a protrusion; 5012b second right-angle side; 5012c second hollow portion; 502 first lead; 503 second lead; 504 bridge line; 505 connection portion; 506 floating electrode; 60 polarizer; and 70 protective cover.

DETAILED DESCRIPTION OF EMBODIMENTS

The following content combines with the drawings and the embodiment for describing the present application in detail. It is obvious that the following embodiments are merely some embodiments of the present application, but not all the embodiments. Based on the embodiments in the present application, for the skilled persons of ordinary skill in the art without creative effort, the other embodiments obtained thereby are still covered by the present application.

A touch display device of the present application includes a display panel and a touch assembly. The touch assembly is positioned on a light-outputting surface of the display panel. The display panel includes a plurality of sub-pixels. The touch assembly includes a touch layer. The display panel can be an organic light-emitting diode display panel or a liquid crystal display panel. For ease of description, the present embodiment is described by taking an organic light-emitting diode display panel as the display panel as an example.

Figure 1:
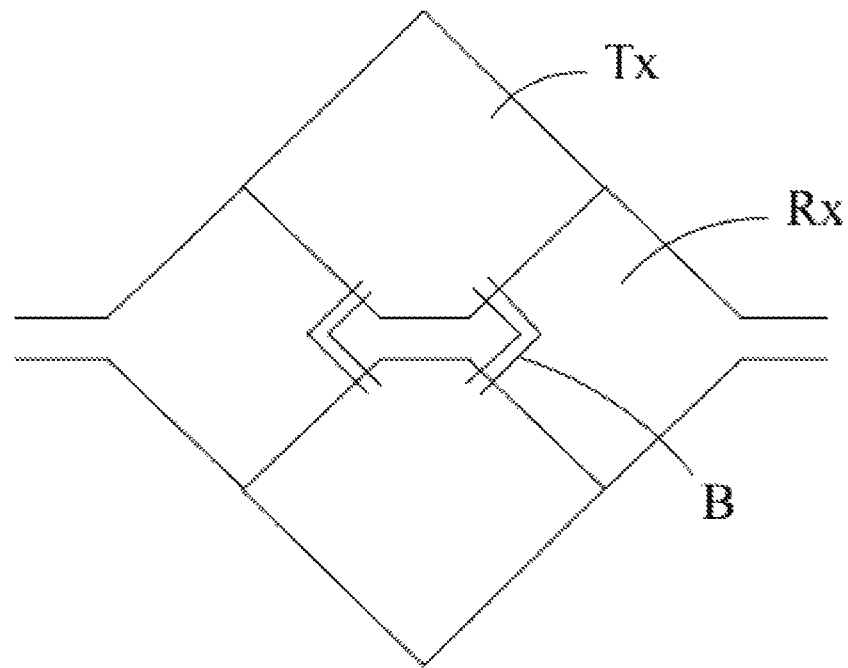
FIG. 1 is a schematic diagram of touch electrodes of a traditional flexible active matrix organic light-emitting diode touch external display screen.
Figure 2:
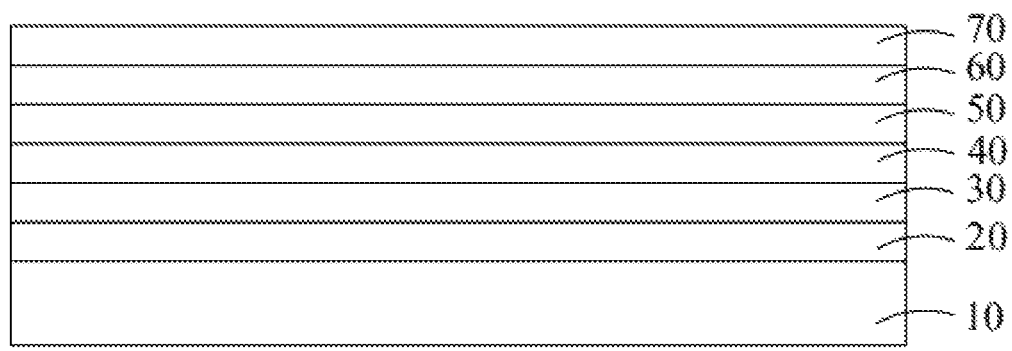
FIG. 2 is a schematic diagram of a touch display device according to an embodiment of the application.

As shown in FIG. 2, it is a schematic diagram of the touch display device according to an embodiment of the present application. The touch display device 100 includes a substrate 10, a thin film transistor array layer 20, an organic light-emitting diode array layer 30, an encapsulation layer a touch layer 50, a polarizer 60, and a protective cover 70 stacked sequentially. The substrate 10, the thin film transistor array layer 20, the organic light-emitting diode array layer 30, and the encapsulation layer 40 constitute the display panel. The encapsulation layer 40 is positioned between the organic light-emitting diode array layer 30 and the touch device.

The substrate 10 is a flexible substrate, and the substrate 10 serves as a carrier to provide a support surface for the thin film transistor array layer 20 and other film layers. The substrate 10 can be a glass substrate or the like.

The thin film transistor array layer 20 includes a plurality of thin film transistors arranged in an array. The thin film transistor is used to control a working state of organic light-emitting diodes in the organic light-emitting diode array layer 30. The thin film transistor can be at least one of an amorphous silicon thin film transistor, a polycrystalline silicon thin film transistor, or a metal oxide thin film transistor.

The organic light-emitting diode array layer 30 includes a plurality of organic light-emitting diodes arranged in an array arrangement. The organic light-emitting diodes arranged in the array arrangement include a plurality of independent anodes, an organic light-emitting unit corresponding to each anode, and a common cathode. The organic light-emitting diodes arranged in the array arrangement constitute the sub-pixels of the organic light-emitting diode display panel, and one organic light-emitting diode corresponds to one sub-pixel. The sub-pixels include red sub-pixels, blue sub-pixels, and green sub-pixels. A shape of the sub-pixels is square, diamond or rectangular, and a size of the sub-pixels is tens of microns.

The encapsulation layer 40 is a thin-film encapsulation layer. The thin-film encapsulation layer includes two inorganic layers and an organic layer between the two inorganic layers. The inorganic layer is formed by chemical sputtering deposition, and the organic layer is formed by coating or the like. A thickness of the thin-film encapsulation layer ranges from 3 microns to 10 microns, such as 5 microns, 6 microns, or 8 microns. A preparation material of the inorganic layer is selected from silicon nitride or silicon oxide, and a preparation material of the organic layer is selected from polyimide or the like. The encapsulation layer 40 can also be a glass encapsulation cover.

The polarizer 60 is used to increase a transmittance of ambient light in the touch display device, so as to improve a contrast ratio of the touch display device during display. The protective cover 70 is configured to protect film layers such as the polarizer 60. The protective cover 70 is a transparent polyimide layer.

Figure 3:
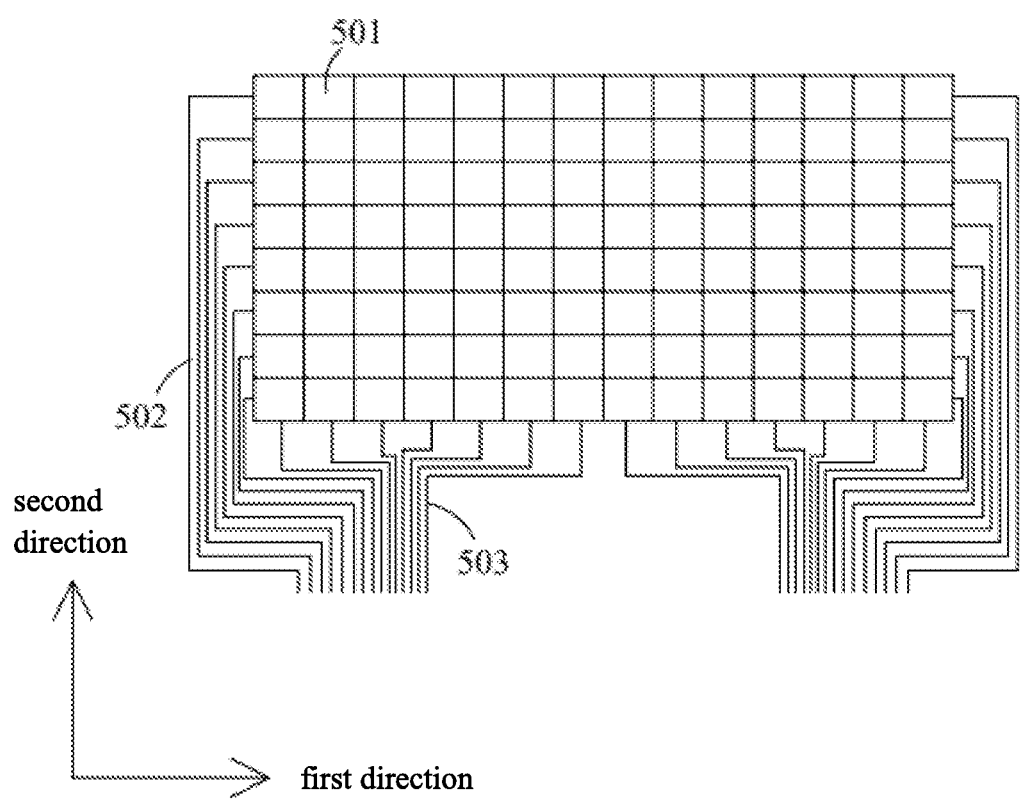
FIG. 3 is a schematic diagram of a driving structure of a touch layer of the touch display device according to an embodiment of the present application.
Figure 4:
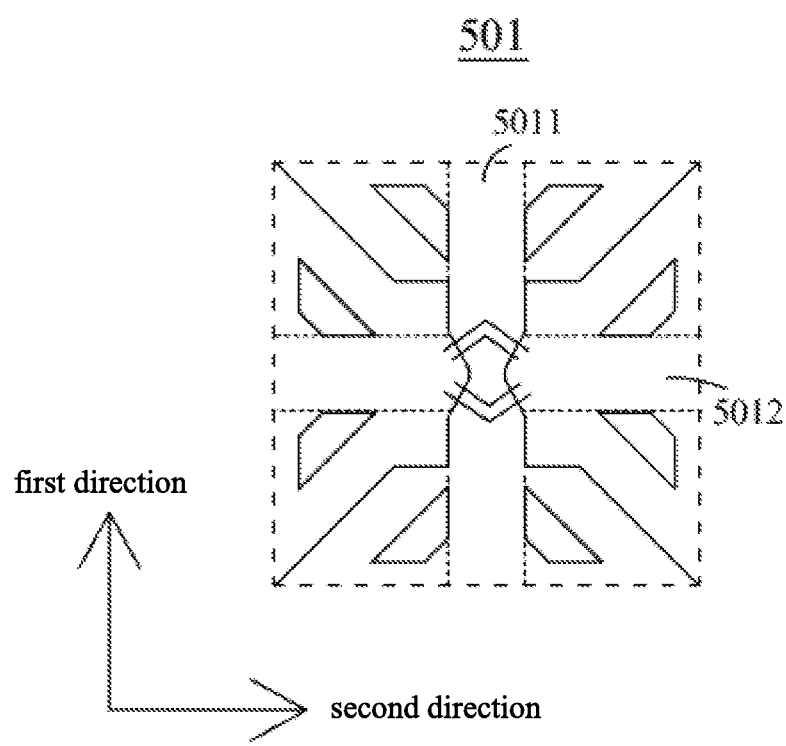
FIG. 4 is a schematic diagram of a touch unit shown in FIG. 3.
Figure 5:
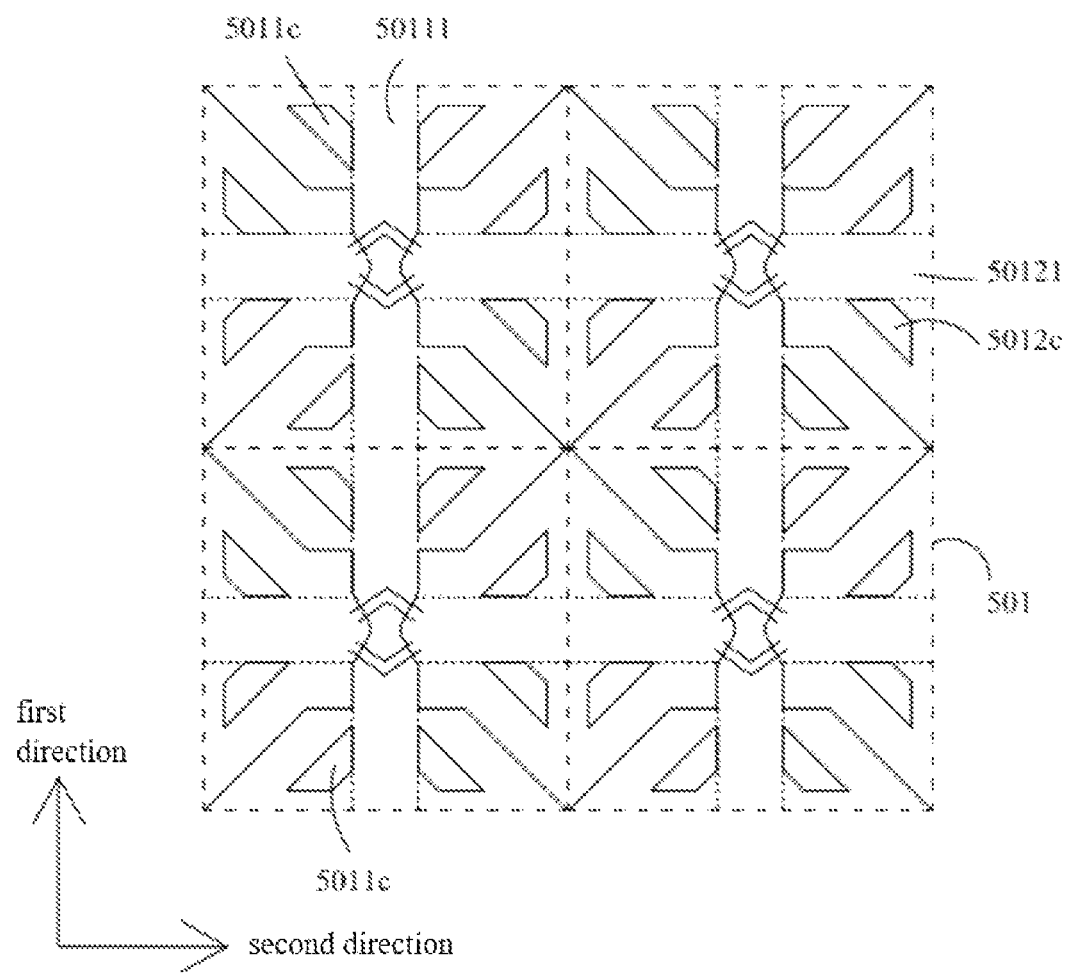
FIG. 5 is a schematic diagram of an array arrangement of multiple touch units shown in FIG. 3.

Please refer to FIGS. 3-5, FIG. 3 is a schematic diagram of a driving structure of a touch layer of the touch display device according to an embodiment of the present application, FIG. 4 is a schematic diagram of a touch unit shown in FIG. 3, and FIG. 5 is a schematic diagram of an array arrangement of multiple touch units shown in FIG. 3.

The touch layer 50 includes a plurality of touch units 501, a plurality of first leads 502, and a plurality of second leads 503. The touch display device also includes a touch chip (not shown).

A size of the touch layer 50 along a first direction is greater than a size of the touch layer 50 along a second direction, and the first direction is perpendicular to the second direction. The touch units 501 are arranged in an array along the first direction and the second direction. Each of the touch units 501 has a square shape. Each of the touch units 501 includes a first electrode 5011 and a second electrode 5012, and the first electrode 5011 is electrically insulated from the second electrode 5012. A plurality of first electrodes 5011 are disposed along the first direction, and a plurality of second electrodes 5012 are disposed along the second direction.

The plurality of first electrodes 5011 in a same row are disposed along the first direction to form a first electrode channel, a plurality of first electrode channels are arranged in the second direction, and the first electrodes 5011 in the same row are electrically connected to each other. A plurality of second electrodes 5012 in a same column are disposed along the second direction to form a second electrode channel, a plurality of second electrode channels are arranged in the first direction, and the second electrodes 5012 in the same column are electrically connected to each other. A number of first electrode channel is less than a number of second electrode channel, and a number of first electrodes 5011 arranged on each first electrode channel is greater than a number of second electrode 5012 arranged on each second electrode channel, that is, the number of first electrode 5011 arranged in a same row along the first direction is greater than the number of second electrode 5012 arranged in a same row in the second direction. An impedance of each first electrode channel is greater than an impedance of each second electrode channel.

In the present embodiment, in each of the touch units 501, a parasitic capacitance of each first electrode 5011 is less than a parasitic capacitance of each second electrode 5012, so that a parasitic capacitance of the first electrode channel is reduced. Specifically, the parasitic capacitance of the first electrode 5011 is less than or equal to 8 picofarads and greater than 0 picofarad (pf), such as 6 picofarads, 5 picofarads, 3 picofarads, etc.; the parasitic capacitance of the second electrode 5012 is less than or equal to 10 picofarads and greater than 0 picofarad, such as 8 picofarads, 6 picofarads, and 4 picofarads.

Specifically, in each of the touch units 501, an effective area of each first electrode 5011 is less than an effective area of each second electrode 5012, wherein the effective area is an area of a conductive portion, each of the first electrode 5011 and the second electrode 5012 includes a conductive portion so that the parasitic capacitance of the first electrode 5011 is less than the parasitic capacitance of the second electrode 5012. When the first electrode 5011 and the second electrode 5012 are composed of a metal grid, the effective area refers to an area where the metal grid is distributed.

Two opposite ends of each first electrode channel are respectively connected to one of the first leads 502, and an end of each second electrode channel is connected to one of the second leads 503. Specifically, for each first electrode channel, one of the first leads 502 is connected to the first electrode 5011 at one end of the first electrode channel, and another one of the first leads 502 is connected to the first electrode 5011 at another end of the first electrode channel. For each second electrode channel, one of the second leads 503 is connected to the second electrode 5012 at one end of the second electrode channel. Both the first leads 502 and the second leads 503 are connected to the touch chip. The touch chip outputs a driving scan signal to each first lead 502 and receives a sensing signal output from each second lead 503. In the present embodiment, the touch layer adopts a 2 T1R architecture. Since each first electrode channel is driven bilaterally, a load that the touch chip needs to drive each first electrode channel is reduced, thereby effectively increasing a sensing frequency and a touch reporting rate.

In the present embodiment, each of the first electrode 5011 and the second electrode 5012 is composed of a metal grid. The metal grid is designed to surround the sub-pixels of the organic light-emitting diode array layer to prevent metal wires of the metal grid from interfering with light emitted by the sub-pixels. Since the sub-pixels are oblique design, the metal grid is also oblique design.

In the present embodiment, the sub-pixels are designed as squares, rectangles, or diamonds, and correspondingly, a hollow portion of the metal grid is diamond-shaped or square. A bridge line 504 is composed of a metal grid, in order to adapt to the sub-pixel oblique design, the bridge line 504 is arranged in a V-shape. The connection portion 505 is also composed of a metal grid.

Figure 8:
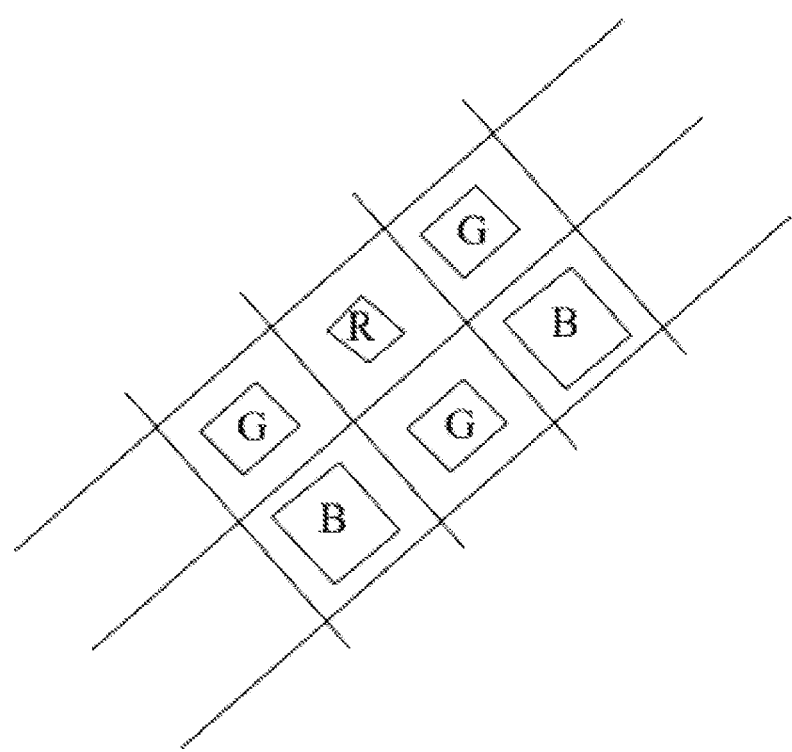
FIG. 8 is a schematic diagram of a metal grid surrounding sub-pixels.

As shown in FIG. 8, it is a schematic diagram of a metal grid surrounding sub-pixels, where R is a red sub-pixel, G is a green sub-pixel, and B is a blue sub-pixel, the grid lines are metal grid, and the metal grid is designed to surround the sub-pixels. Each metal grid is provided with a sub-pixel.

In the present embodiment, near an intersection of the first electrode 5011 and the second electrode 5012, the first electrode 5011 includes at least one recessed portion 5011a, and the second electrode 5012 includes at least one protrusion 5012a mating with the at least one recessed portion 5011a.

Each first electrode 5011 includes two first isosceles right-angled triangular electrodes that are electrically connected, and each of the second electrode 5012 includes two second isosceles right-angled triangular electrodes electrically connected. Each of the first isosceles right-angled triangular electrodes includes two first right-angle sides 5011b, and at least one of the first right-angle sides 5011b of each first isosceles right-angled triangular electrode is provided with the at least one recessed portion 5011a. Each of the second isosceles right-angled triangular electrodes includes two second right-angled sides, and at least one of the second right-angle sides 5012b of each of the second isosceles right-angled triangular electrodes is provided with the at least one protrusion 5012a.

Specifically, the two first right-angle sides 5011b of each first isosceles right-angled triangular electrode are provided with the recessed portion 5011a, and the recessed portions 5011a on the two first right-angle sides 5011b are symmetrically provided. The two second right-angle sides 5012b of each second isosceles right-angled triangular electrode are provided with the protrusions 5012a. The recessed portion 5011a on the first right-angle side 5011b is arranged mating with the protrusion 5012a on the second right-angle side 5012b adjacent to the first right-angle side 5011b.

In the present application, by providing the recessed portion 5011a on the first electrode 5011 and the protrusion 5012a on the second electrode 5012 to ensure that the impedance of the first electrode 5011 near the intersection of the first electrode 5011 and the second electrode 5012 does not increase, while reducing the impedance of the second electrode 5012 near the intersection of the first electrode 5011 and the second electrode 5012, a resistance-capacitance load of the second electrode 5012 and the time required for scanning the touch display device are thereby reduced, thus increasing the reporting rate. Moreover, the matching arrangement between the recessed portion 5011a and the protrusion 5012a increases a mutual capacitance between the first electrode 5011 and the second electrode 5012.

The first electrode 5011 is continuously formed, and the second electrode 5012 is connected by the bridge line 504. Specifically, the two first isosceles right-angled triangular electrodes of the first electrode 5011 are arranged symmetrically with respect to the second rectangular trunk, and are connected by the connection portion 505, the connection portion 505 is provided in a same layer as the first electrode 5011 and the second electrode 5012. The connection portion 505 connects apex angles of the two first isosceles right-angled triangular electrodes. Two of the second isosceles right-angled triangle electrodes of the second electrode 5012 are symmetrically arranged and connected by the bridge line 504, the bridge line 504 is positioned at a different layer from the second electrode 5012, and the bridge line 504 connects apex angles of the two second isosceles right-angled triangle electrodes. The second electrode 5012 having the protrusion 5012a is connected through the bridge line 504, and the bridge line 504 spans the first electrode 5011 having the recessed portion 5011a, so that an overlapping area between the bridge line 504 and the first electrode 5011 is reduced, a basic capacitance formed between the first electrode 5011 and the bridge line 504 is reduced, which is beneficial to improve touch performance.

It should be noted that an electrode pattern composed of two adjacent first isosceles right-angled triangular electrodes adjacent to two touch units 501 in the first direction is substantially diamond-shaped, and an electrode pattern composed of two adjacent second isosceles right-angled triangular electrodes adjacent to two touch units 501 in the second direction is substantially diamond-shaped.

Figure 6:
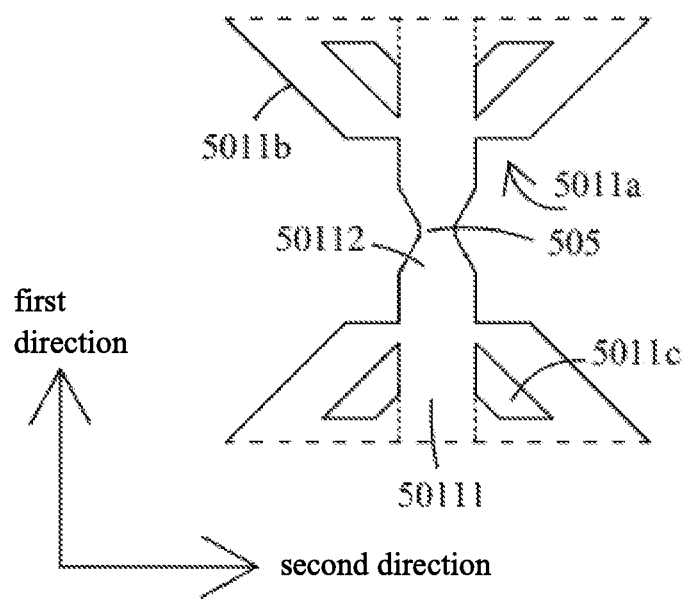
FIG. 6 is a schematic diagram of a first electrode of the touch unit shown in FIG. 4.

As shown in FIG. 6, the first electrode 5011 includes a first rectangular trunk 50111 extending in the first direction, and at least one recessed portion 5011a is disposed along an edge of the first rectangular trunk 50111 parallel to the first direction. The first electrode 5011 is arranged symmetrically with respect to the first rectangular trunk 50111, the first rectangular trunk 50111 is configured to transmit current. The first electrode 5011 includes a plurality of recessed portions 5011a, and the recessed portions 5011a are symmetrically disposed on opposite sides of the first rectangular trunk 50111. Specifically, each first electrode 5011 includes four recessed portions 5011a. A recessed portion 5011a is provided on each of the two first right-angle sides 5011b of each first isosceles right-angled triangular electrode. The recessed portion can be provided in a middle position of a corresponding first right-angle side 5011b.

Figure 7:
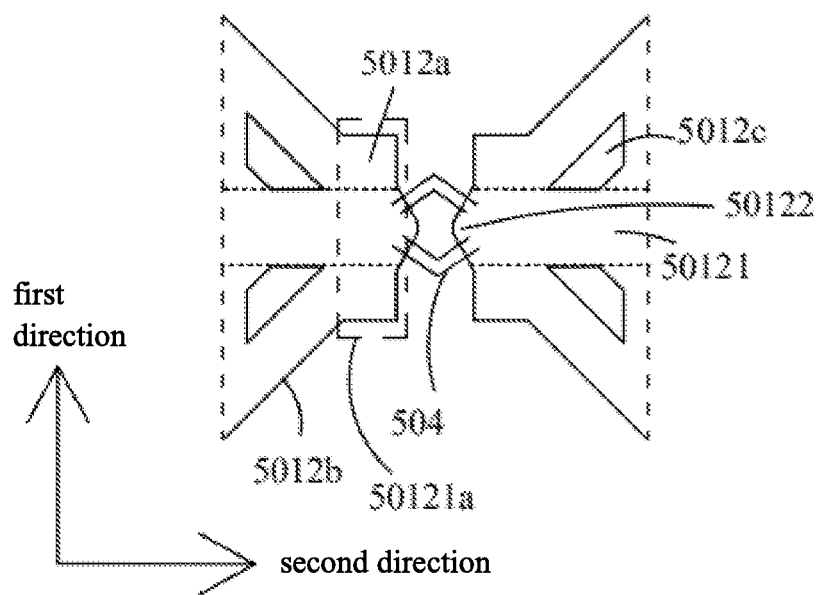
FIG. 7 is a schematic diagram of a second electrode of the touch unit shown in FIG. 4.

As shown in FIG. 7, the second electrode 5012 includes a second rectangular trunk 50121 extending in the second direction. The second rectangular trunk 50121 includes a widening portion 50121a at a position close to the intersection of the first electrode 5011 and the second electrode 5012. The widening portion 50121a includes the protrusion 5012a. Each second right-angle side 5012b of each second isosceles right-angled triangular electrode is respectively provided with a protrusion 5012a. The widening portion 50121a reduces a resistance of the second rectangular trunk 50121 of the second electrode 5012 near the intersection of the first electrode 5011 and the second electrode 5012, which is more conducive to a transmission of electrical signals near the intersection. The protrusion 5012a is provided at a middle position of a corresponding second right-angle side.

The arrangement of the first rectangular trunk 50111 allows a current parallel to the first rectangular trunk 50111 to conduct better, and the arrangement of the second rectangular trunk 50121 allows the current parallel to the second rectangular trunk 50121 to conduct better, reducing the impedance of the first electrode channel and the second electrode channel, thereby effectively reducing the resistance-capacitance delay of the first electrode channel and the second electrode channel, reducing the time required for scanning the touch electrodes (first electrode 5011 and second electrode 5012) of the touch display device 100, and effectively increasing the touch reporting rate.

In the present embodiment, cross-sections of the recessed portion 5011a and the protrusion 5012a are right-angled triangles, and the right-angled triangles are isosceles right-angled triangles. A partial edge of the recessed portion 5011a coincides with an edge portion of the first rectangular trunk 50111 parallel to the first direction. A partial edge of the protrusion 5012a coincides with an edge portion of the second rectangular trunk 50121 parallel to the second direction.

In the present embodiment, the first rectangular trunk 50111 surrounds at least five sub-pixels along a width of the first rectangular trunk 50111, for example, the first rectangular trunk 50111 surrounds six sub-pixels, 7.5 sub-pixels, or ten sub-pixels along the width of the first rectangular trunk 50111. The greater the width of the first rectangular trunk 50111 is, the more advantageous it is for reducing the impedance of the first rectangular trunk 50111.

The second rectangular trunk 50121 surrounds at least five sub-pixels along a width of the second rectangular trunk 50121, for example, the second rectangular trunk 50121 surrounds six sub-pixels, 7.5 sub-pixels, or ten sub-pixels along the width of the second rectangular trunk 50121. The greater the width of the second rectangular trunk 50121 is, the more advantageous it is for reducing the impedance of the second rectangular trunk 50121.

A difference between number of the sub-pixels surrounded by the widening portion 50121a in a width direction of the second rectangular trunk 50121 (parallel to the first direction) and number of the sub-pixels surrounded by the second rectangular trunk 50121 in the width direction of the second rectangular trunk 50121 is greater than or equal to five and less than or equal to fifteen. For example, the difference is 5, 7, 9, 11, and 13, etc.

In the present embodiment, at the intersection of the first electrode 5011 and the second electrode 5012, the first electrode 5011 further includes a first narrowing portion 50112 connected to the first rectangular trunk 50111, a width of the first narrowing portion 50112 decreases from close the first rectangular trunk 50111 to away from the first rectangular trunk 50111, and the first narrowing portion 50112 surrounds at least two sub-pixels along a width direction of the first rectangular trunk, that is, at the intersection of the first electrode 5011 and the second electrode 5012, the first electrode 5011 surrounds at least two of the sub-pixels along the width direction of the first rectangular trunk 50111. At the intersection of the first electrode 5011 and the second electrode 5012, the second electrode 5012 further includes a second narrowing portion 50122 connected to the second rectangular trunk 50121. A width of the second narrowing portion 50122 decreases from close the second rectangular trunk 50121 to away from the second rectangular trunk 50121, and the width of the second narrowing portion 50122 surrounds at least two sub-pixels in the width direction of the second rectangular trunk 50121, that is, at the intersection of the first electrode 5011 and the second electrode 5012, the second electrode surrounds at least two of the sub-pixels along the width direction of the second rectangular trunk 50121. The widths of the first electrode 5011 and the second electrode 5012 gradually decrease near the intersection to reduce the basic capacitance between the bridge line connecting the second electrode 5012 and the first electrode 5011 positioned at the intersection, while the capacitance here generally does not change during a finger touch process.

The bridge line 504 connects the two second narrowing portions 50122 at the intersection of the first electrode 5011 and the second electrode 5012. The connection portion 505 connects the two first narrowing portions 50112 at the intersection of the first electrode 5011 and the second electrode 5012.

In the present embodiment, the first electrode 5011 includes a plurality of first hollow portions 5011c, the first hollow portions 5011c are symmetrically disposed on opposite both sides of the first rectangular trunk 50111, and the first hollow portions 5011c are disposed along the edge of the first rectangular trunk 50111 parallel to the first direction; and/or, the second electrode 5012 includes a plurality of second hollow portions 5012c, the second hollow portions 5012c are symmetrically disposed on opposite sides of the second rectangular trunk 50121, and the second hollow portions 5012c are disposed along an edge of the second rectangular trunk 50121 parallel to the second direction.

By providing the first hollow portions 5011c and/or the second hollow portions 5012c to reduce an area of the first electrode 5011 and/or the second electrode 5012, the parasitic capacitance formed between the first electrode 5011 and/or the second electrode 5012 and the cathode of the organic light-emitting diode array layer is reduced, and an influence of the parasitic capacitance between the first electrode 5011 and/or the second electrode 5012 and the cathode on the electrical signals conducted by the first electrode 5011 and the second electrode 5012 is reduced. Positions of the first hollow portions 5011c and the second hollowed portions 5012c are respectively disposed at an outer side of the first rectangular trunk 50111 and the second rectangular trunk 50121, which, compared to the said positions being disposed on the first rectangular trunk 50111 and the second rectangular trunk 50121, can prevent the resistance of the first rectangular trunk 50111 and the second rectangular trunk 50121 from being lowered.

Specifically, the first electrode 5011 includes a plurality of first hollow portions 5011c, the first hollow portions 5011c are symmetrically disposed on opposite both sides of the first rectangular trunk 50111, and the first hollow portions 5011c are disposed along the edge of the first rectangular trunk 50111 parallel to the first direction; the second electrode 5012 includes a plurality of second hollow portions 5012c, the second hollow portions 5012c are symmetrically disposed on opposite sides of the second rectangular trunk 50121, and the second hollow portions 5012c are disposed along the edge of the second rectangular trunk 50121 parallel to the second direction, so as to reduce the parasitic capacitance of the first electrode 5011 and the second electrode 5012.

In other embodiments, the first hollow portions 5011c of the first electrode 5011 can be disposed on opposite sides of the first rectangular trunk 50111, and the first hollow portions 5011c are disposed along the edge of the first rectangular trunk 50111 parallel to the first direction, and the second electrode 5012 is not provided with the hollow portions. Alternatively, the second hollow portions 5012c of the second electrode 5012 are symmetrically disposed on opposite sides of the second rectangular trunk 50121, and the second hollow portions 5012c are disposed along the edge of the second rectangular trunk 50121 parallel to the second direction.

An included angle between the first hollow portions 5011c and the first rectangular trunk 50111 is greater than 0 degree and less than 90 degrees, and the first hollow portions extend in a direction away from the two second rectangular trunk 50121 adjacent to the first hollow portions 5011c. The included angle between the first hollow portions 5011c and the first rectangular trunk 50111 is 30 degrees, 50 degrees, 60 degrees, or 80 degrees. Specifically, the included angle between the first hollow portion 5011c and the first rectangular trunk 50111 is equal to 45 degrees.

An included angle between the second hollow portion 5012c and the second rectangular trunk 50121 is greater than 0 degree and less than degrees, and the second hollow portions 5012c extend in a direction away from the first rectangular trunk 50111 adjacent to the second hollow portions 5012c. The included angle between the second hollow portions 5012c and the second rectangular trunk 50121 is 30 degrees, 50 degrees, 60 degrees, or 80 degrees. Specifically, the included angle between the second hollow portions 5012c and the second rectangular trunk 50121 is equal to 45 degrees.

By setting the included angle between the first hollow portions 5011c and the first rectangular trunk 50111 equal to 45 degrees, so that the first hollow portions 5011c are parallel to the first right-angle side of the first isosceles right-angled triangular electrode, and setting the included angle between and the second hollow portions 5012c and the second rectangular trunk 50121 equal to 45 degrees, so that the second hollow portions 5012c are parallel to the second right-angle side of the second isosceles right-angled triangular electrode, a portion between the second hollow portion 5012c and the second right-angle side and a portion between the first hollow portion 5011c and the first right-angle side thereby form a more uniform mutual capacitance.

Specifically, a shape of the first hollow portions 5011c is trapezoidal, and a shape of the second hollow portions 5012c is trapezoidal. The first hollow portions 5011c are formed by enclosing a first bottom edge, a first top edge, a first hypotenuse, and a second hypotenuse, the first bottom edge is opposite to and parallel to the first top edge, the first hypotenuse is opposite to the second hypotenuse, the first hypotenuse is connected between the first bottom edge and the first top edge, the second hypotenuse is connected between the first bottom edge and the first top edge, and the first hypotenuse coincides with an edge portion of the first rectangular trunk 50111 parallel to the first direction; the second hollow portions 5012c are formed by enclosing a second bottom edge, a second top edge, a third hypotenuse, and a fourth hypotenuse, the second bottom edge is opposite and parallel to the second top edge, the third hypotenuse is opposite to the fourth hypotenuse, the third hypotenuse is connected between the second bottom edge and the second top edge, the fourth hypotenuse is connected between the second bottom edge and the second top edge, and the third hypotenuse coincides with an edge portion of the second rectangular trunk 50121 parallel to the second direction.

In the present embodiment, the touch layer further includes a floating electrode 506, the floating electrode 50 is electrically insulated from the first electrode and the second electrode, and a plurality of floating electrodes 506 are respectively disposed in the first hollow portions 5011c and in the second hollow portions 5012c, to make the organic light-emitting diode display panel emit light through the touch layer 50 having optical uniformity. The floating electrode 506 is provided in a same layer as the first electrode 5011 and the second electrode 5012, a size of the floating electrode 506 in the first hollow portion 5011c is almost the same as a size of the first hollow portion 5011c, and a size of the floating electrode 506 in the second hollow portion 5012c is almost the same as a size of the second hollow portion 5012c. The floating electrode is also composed of a metal grid.

It should be noted that the first electrode 5011 and the second electrode 5012 of the present application are used to relieve a problem of greater impedance of a main trunk of the traditional diamond-shaped electrode, which causes the performance of touch reporting rate of the diamond-shaped touch electrode to decrease. The edge of a diamond-shaped electrode is recessed to keep a main trunk resistance of a diamond-shaped electrode from decreasing and the edge of the other diamond-shaped electrode is protruded to reduce the resistance of the other diamond-shaped electrode near the intersection and improve the resistance at the intersection. Since a peripheral edge design of the diamond-shaped electrode is still maintained (the first right-angled edge corresponds to the second right-angled edge), there is sufficient side field capacitance between the first electrode and the second electrode. Compared with cross-shaped touch electrodes (driving electrodes and sensing electrodes are both strip-shaped and perpendicular to each other), the present application has a larger side field capacitance. The design of the touch units of the present application combines the advantages of the diamond-shaped electrode and the cross-shaped electrode.

It should also be noted that the dashed lines in FIGS. 4-7 are not a component of the touch layer, but the dashed lines are only used to illustrate the composition of each part of the touch layer.

The descriptions of the above embodiments are only used to help understand the technical solutions and core ideas of the present application. The technical scope of the present invention is not limited to the above description, a person skilled in the art can make various modifications and changes to the above embodiments without departing from the technical idea of the present invention, and such variations and modifications are intended to be within the scope of the invention.

What is claimed is:

1. A touch assembly, comprising a touch layer, wherein the touch layer comprises a plurality of touch units, and each of the touch units comprises:
   a first electrode disposed along a first direction; and,
   a second electrode disposed along a second direction, wherein the first electrode is electrically insulated from the second electrode;
   wherein near an intersection of the first electrode and the second electrode, the first electrode comprises at least one recessed portion, and the second electrode comprises at least one protrusion mating with the at least one recessed portion;
   wherein the first electrode comprises a first rectangular trunk extending in the first direction, the at least one recessed portion is disposed along an edge of the first rectangular trunk parallel to the first direction; and
   wherein the second electrode comprises a second rectangular trunk extending in the second direction, the second rectangular trunk comprises a widening portion arranged near the intersection of the first electrode and the second electrode, and the widening portion comprises the at least one protrusion;
   wherein the first electrode comprises a plurality of first hollow portions, the first hollow portions are symmetrically disposed on opposite sides of the first rectangular trunk, and the first hollow portions are disposed along the edge of the first rectangular trunk parallel to the first direction; and/or
   wherein the second electrode comprises a plurality of second hollow portions, the second hollow portions are symmetrically disposed on opposite sides of the second rectangular trunk, and the second hollow portions are disposed along an edge of the second rectangular trunk parallel to the second direction.

2. The touch assembly of claim 1, wherein each of the first electrode comprises a plurality of the recessed portions, and the recessed portions are symmetrically disposed on opposite sides of the first rectangular trunk.

3. The touch assembly of claim 1, wherein an included angle between the first hollow portions and the first rectangular trunk is greater than 0 degree and less than 90 degrees, and the first hollow portions extend in a direction away from the second rectangular trunk adjacent to the first hollow portions; and
   wherein an included angle between the second hollow portions and the second rectangular trunk is greater than 0 degree and less than 90 degrees, and the second hollow portions extend in a direction away from the first rectangular trunk adjacent to the second hollow portion.

4. The touch assembly of claim 3, wherein the included angle between the first hollow portions and the first rectangular trunk is equal to 45 degrees, and the included angle between the second hollow portions and the second rectangular trunk is equal to 45 degrees.

5. The touch assembly of claim 1, wherein the touch layer further comprises a plurality of floating electrodes, the plurality of floating electrodes are electrically insulated from the first electrode and the second electrode, and the plurality of the floating electrodes are respectively disposed in the first hollow portions and the second hollow portions.

6. The touch assembly of claim 1, wherein a shape of each of the first hollow portions is trapezoidal, and a shape of each of the second hollow portions is trapezoidal.

7. The touch assembly of claim 6, wherein the first hollow portions are formed by enclosing a first bottom edge, a first top edge, a first hypotenuse, and a second hypotenuse, the first bottom edge is opposite to and parallel to the first top edge, the first hypotenuse is opposite to the second hypotenuse, the first hypotenuse is connected between the first bottom edge and the first top edge, the second hypotenuse is connected between the first bottom edge and the first top edge, and the first hypotenuse coincides with an edge portion of the first rectangular trunk parallel to the first direction; and
   wherein the second hollow portions are formed by enclosing a second bottom edge, a second top edge, a third hypotenuse, and a fourth hypotenuse, the second bottom edge is opposite and parallel to the second top edge, the third hypotenuse is opposite to the fourth hypotenuse, the third hypotenuse is connected between the second bottom edge and the second top edge, the fourth hypotenuse is connected between the second bottom edge and the second top edge, and the third hypotenuse coincides with an edge portion of the second rectangular trunk parallel to the second direction.

8. The touch assembly of claim 1, wherein at the intersection of the first electrode and the second electrode, the first electrode further comprises a first narrowing portion connected to the first rectangular trunk, a width of the first narrowing portion decreases from close the first rectangular trunk to away from the first rectangular trunk; and
   the second electrode further comprises a second narrowing portion connected to the second rectangular trunk, and a width of the second narrowing portion decreases from close the second rectangular trunk to away from the second rectangular trunk.

9. The touch assembly of claim 1, wherein the first electrode is continuously formed, the second electrode is connected by a bridge line, and the bridge line and the first electrode are positioned at different layers.

10. The touch assembly of claim 1, wherein number of the first electrode arranged in a row along the first direction is greater than number of the second electrode arranged in a row along the second direction, and a parasitic capacitance of each of the first electrode is less than a parasitic capacitance of each of the second electrode.

11. The touch assembly of claim 10, wherein the parasitic capacitance of each of the first electrode is less than or equal to 8 picofarads and greater than 0 picofarad, and the parasitic capacitance of each of the second electrode is less than or equal to 10 picofarads and greater than 0 picofarad.

12. The touch assembly of claim 1, wherein an effective area of each of the first electrode is less than an effective area of each of the second electrode, and the effective area is an area of a conductive portion.

13. The touch assembly of claim 1, wherein each of the first electrode comprises two first isosceles right-angled triangular electrodes electrically connected, each of the first isosceles right-angled triangular electrodes comprises two first right-angle sides, and at least one of the first right-angle sides of each first isosceles right-angled triangular electrode is provided with the at least one recessed portion; and
   wherein each of the second electrode comprises two second isosceles right-angled triangular electrodes electrically connected, each of the second isosceles right-angled triangular electrodes comprises two second right-angled sides, and at least one of the second right-angle sides of each of the second isosceles right-angled triangular electrodes is provided with the at least one protrusion.

14. The touch assembly of claim 1, wherein cross-sectional shapes of the at least one recessed portion and the at least one protrusion are right-angled triangles.

15. A touch display device, wherein the touch display device comprises the touch assembly of claim 1 and a display panel.

16. The touch display device of claim 15, wherein the first electrode comprises a first rectangular trunk extending in the first direction, and the at least one recessed portion is disposed along an edge of the first rectangular trunk parallel to the first direction; and wherein the second electrode comprises a second rectangular trunk extending in the second direction, the second rectangular trunk comprises a widening portion arranged near the intersection of the first electrode and the second electrode, and the widening portion comprises the at least one protrusion.

17. The touch display device of claim 16, wherein the display panel comprises a plurality of sub-pixels, the touch assembly is positioned on a light-outputting surface of the display panel, wherein the first rectangular trunk surrounds at least five of the sub-pixels along a width direction of the first rectangular trunk;

wherein the second rectangular trunk surrounds at least five of the sub-pixels along a width direction of the second rectangular trunk, and a difference between number of the sub-pixels surrounded by the widening portion in the width direction of the second rectangular trunk and number of the sub-pixels surrounded by the second rectangular trunk in the width direction of the second rectangular trunk is greater than or equal to five and less than or equal to fifteen; and wherein the first electrode and the second electrode are both composed of a metal grid.

18. The touch display device of claim 17, wherein at the intersection of the first electrode and the second electrode, the first electrode surrounds at least two of the sub-pixels along the width direction of the first rectangular trunk, and the second electrode surrounds at least two of the sub-pixels along the width direction of the second rectangular trunk.

* * * * *